(No Model.)

G. D. SMITH.
SERVICE AND CASH CHECK.

No. 449,973. Patented Apr. 7, 1891.

```
. . .  5  . ·a· 60
. ·a· 4  . . . 55
. . ·A·3 . . . 50  A
. . . 2  . . . 45
·a· ⊙ 1  ·a· . 40
. . . 95 . . ⊙ 35
. . . 90 . . . 30
. . . 85 . ·a· 25
·a· 80 A . . . 20
. . . 75 . . ⊙ 15  A
. . . 70 . . . 10
·a· . 65 . ·a·  5
```

Compare amount WRITTEN IN INK on Check with Bill of Fare. If correct, please pay waiter.

WAITER No.  $ 1.50
13.

64240 A

WAITER No.   A
13
$ 1.50

Guests Must Not Pay this Coupon.

WITNESSES:
Paul Johnst
C. Sedgwick

INVENTOR:
G. D. Smith
BY
Munn & Co
ATTORNEYS.

UNITED STATES PATENT OFFICE.

GEORGE D. SMITH, OF NEW YORK, N. Y.

SERVICE AND CASH CHECK.

SPECIFICATION forming part of Letters Patent No. 449,973, dated April 7, 1891.

Application filed September 25, 1889. Serial No. 325,010. (No model.)

*To all whom it may concern:*

Be it known that I, GEORGE D. SMITH, of the city, county, and State of New York, have invented a new and Improved Service and Cash Check, of which the following is a full, clear, and exact description.

My invention relates to service and cash checks designed more especially for use in restaurants where it is the rule for the waiters to collect from the guests or patrons the value of the food served.

The invention has for its object to assure returns to the proprietor to the full value of the food served by preventing collusion of employés and patrons without offense, and also to economize time of patrons and employés and assure more satisfactory service.

The invention will first be described, and will then be particularly pointed out in the claim.

Reference is to be had to the accompanying drawing, forming a part of this specification, and which is a face view of one of the service and cash checks of my invention.

The checks will preferably be made of pasteboard or paper and have about the size shown in the drawing.

On the face of the check are produced one or more rows of numerals A, which range by "fives" from 5 to 95, representing "cents," and also the numerals 1, 2, 3, 4, 5, or more, indicating "dollars," and in front of each of these numerals is placed a row or series of two, three, or more dots or marks *a*, which are intended to be punched out, one of the dots of each row opposite any one of the numerals being punched out each time the food served on any one order is valued at the sum expressed by the numeral. I prefer to arrange the numerals in two vertical rows, one row ranging from 5 to 60 at the "cent" column at the right hand and top of the check and the other row including the "cent" numerals 65 to 95, and the "dollar" numerals 1, 2, 3, 4, 5 arranged at the top and a little to the left of the longitudinal center of the check, which leaves room at the left hand of every numeral for the row of punch-indicating dots *a*, three of which I prefer to place opposite each cent and dollar numeral on the check, as shown in the drawing. The aforesaid arrangement of the numerals groups them most conveniently on a card of comparatively small size, on which, below the numerals, a phrase of instructions B to the guest or patron is produced, this phrase preferably reading "Compare amount written in ink on check with bill of fare. If correct, please pay waiter." Below this phrase B, and preferably at the left hand, are produced the words "Waiter No.," with a space below for the waiter to write his or her number in ink, and at the right hand, below the phrase B, is produced a dollar-mark, $, preferably with a horizontal line running off to the edge of the check as a guide, in writing in ink, next said mark, the sum total the guest or patron is to pay and in accordance with the sum or product of the numerals whose dots have been punched out by a person called the "checker" as the waiter leaves the kitchen with the food or when on his way to serve the guest or patron. Below the waiter-number and dollar-mark characters is produced a serial number and preferably, also, an alphabetical character. The number shown is 64240, and the alphabetical character is the plain block letter A. The serial number on the checks will preferably run in consecutive order from 1 to 1,000,000 and serve as a safeguard against presentation of spurious checks to the checker or cashier, as the numbers will necessarily be higher each day or after each meal. The alphabetical character identifies the series of checks designed especially for one particular restaurant or hotel and prevents the use of checks of one house in another. The letter for each house will differ either in character or design from the letters on the checks of all other houses using the checks. In so far as some features of my invention are concerned the serial number, as also the alphabetical character, may be dispensed with, but their employment is preferred.

At the end of the check opposite the numerals A and their dots *a* is produced a coupon C, preferably having a perforated or pressed line of division *c*, allowing its easy separation from the main body of the check. On this coupon are produced at the top the words "Waiter No." and the alphabetical character corresponding with that on the body of the check, the letter A in the check shown, and below is produced a dollar-mark, ($,) preferably with a ruled line, and below this is produced another phrase D of instructions to the guests or patrons, consisting, preferably, of the words "Guests must not pay this coupon." The waiter writes his number in ink on the coupon, as also on the proper place above named on the body of the check, and the cashier, after the guest or patron is fully served, writes the sum total to be paid next the dollar-mark on the coupon and also on the main body of the check.

The checks are used in the following manner: Each waiter in a restaurant will be handed a bunch or package of checks—say one hundred—which are held together by a stout rubber band and have been carefully counted and charged to his account, and he is instructed never to take a check from the package only as it is required to be punched, and then only in rotation as numbered, under a penalty of a fine or discharge. The waiter must also write his number—say 13—on the body and coupon of each check, as shown in dotted lines in the drawings. The guest's order may or may not be written on the back of the check by him or the waiter. As the waiter passes the checker on his way to the patron with the food ordered, the checker, who is thoroughly familiar with the bill of fare, the food, and the prices, will punch from the check the value of the food in the waiter's hands. For instance, should the patron order fifteen cents' worth, the checker, after examining the food to see that all is right, will punch from the check the dot or mark $a$ in front of the numeral 15, as indicated in dotted lines in the drawings. Should other orders from the same patron follow—say to the amount of one dollar and thirty-five cents—the checker will, as the waiter passes him, punch out the dots $a$ next the one-dollar numeral and next the thirty-five-cent numeral, as also indicated in dotted lines. When a patron is fully served and before the waiter is allowed to collect the amount called for by the punch-marks on it, the cashier adds up the sums opposite the punch-marks and writes the sum total in ink next the dollar-marks on both the main body of the check and its coupon. In the instance named this will be one dollar and fifty cents, which will be written "1.50," as indicated in dotted lines in the drawings. The cashier has at hand a series of numbered spindles, one for each waiter of the house, and after the cashier has written the total "1.50" on the check and coupon he will tear off the coupon on the line $c$ and place it on waiter No. 13's spindle and retain it until he returns with the check and the money collected thereon from the patron. When a check is paid to the cashier either by the waiter or patron, the coupon is returned to the waiter by the cashier as a voucher for the amount paid, and at the close of the day's business or at any specified time of reckoning the cash in hand must correspond with the amounts punched on the checks in the cash-desk and also with the amounts written in ink on the coupons, which under the rule are delivered up by the waiters at the time of reckoning or when they finish their work for the day or night, as the case may be.

Should the patron order two, three, four, or five dollars' worth of food at one time—say for wines or for a party of two or more persons—the checker will correspondingly punch out the dot $a$ next either the two, three, four, or five dollar numeral in the left-hand row or series on the check, as required. Subsequent orders, whether below, at, or above one dollar in value and for the same sum or sums once punched out on the check, will be registered by punching out the second or third dot $a$ opposite the cent or dollar numeral required, and should a fourth order be given by one patron for food of like value, the numeral itself may be punched out to indicate this; but this will hardly ever be required.

It is manifest that with this one comparatively small check food to the value of about one hundred dollars may be registered unfailingly by the punch-marks.

Having thus fully described my invention, I claim as new and desire to secure by Letters Patent—

A service and cash check provided with a series of numerals indicating successively higher values of food served, and provided also with a series of dots or marks opposite each of the numerals, substantially as described, whereby like orders of the same value may be registered by punching out successively the dots or marks of the series opposite the corresponding numerals of the check, as set forth.

GEORGE D. SMITH.

Witnesses:
 HENRY L. GOODWIN,
 MORRIS E. STERNE.